(12) United States Patent
Rolph et al.

(10) Patent No.: US 10,480,976 B2
(45) Date of Patent: Nov. 19, 2019

(54) FLOWMETER

(71) Applicant: KROHNE AG, Basel (CH)

(72) Inventors: Christopher Rolph, Northants (GB); Tao Wang, Canterburry (GB)

(73) Assignee: KROHNE AG, Basel (CH)

( * ) Notice: Subject to any disclaimer, the term of this patent is extended or adjusted under 35 U.S.C. 154(b) by 0 days.

(21) Appl. No.: 15/928,155

(22) Filed: Mar. 22, 2018

(65) Prior Publication Data
US 2018/0274960 A1 Sep. 27, 2018

(30) Foreign Application Priority Data
Mar. 24, 2017 (DE) .................. 10 2017 106 375

(51) Int. Cl.
*G01F 1/84* (2006.01)
*G01F 15/00* (2006.01)
*G01F 15/18* (2006.01)

(52) U.S. Cl.
CPC .......... *G01F 1/8409* (2013.01); *G01F 1/8459* (2013.01); *G01F 15/00* (2013.01); *G01F 15/185* (2013.01); *G01F 1/849* (2013.01)

(58) Field of Classification Search
CPC ........................................................ G01F 1/84
See application file for complete search history.

(56) References Cited

U.S. PATENT DOCUMENTS

| 6,711,958 | B2 | 3/2004 | Bitto et al. |
| 6,860,158 | B2 | 3/2005 | Bitto et al. |
| 6,874,373 | B1 | 4/2005 | Rolph |
| 7,287,437 | B2 * | 10/2007 | Kroemer .............. G01F 1/662 73/861.25 |
| 7,509,879 | B2 | 3/2009 | Rieder et al. |
| 2004/0261519 | A1 | 12/2004 | Nozoe et al. |
| 2004/0261522 | A1 | 12/2004 | Dykas et al. |
| 2010/0089174 | A1 | 4/2010 | Van Cleve |

FOREIGN PATENT DOCUMENTS

DE 10 2009 030 904 A1 12/2010
WO 2017/048235 A1 3/2017

* cited by examiner

*Primary Examiner* — Jewel V Dowtin
(74) *Attorney, Agent, or Firm* — David S. Safran; Roberts Mlotkowski Safran Cole & Calderon, P.C.

(57) ABSTRACT

The flowmeter having at least one measuring tube and having at least one inlet element, wherein the inlet element is connected to the at least one measuring tube and is arranged before the at least one measuring tube in respect to flow direction. The flowmeter that is also suitable for the verification of erosive media is achieved in that at least one inflow element is provided, wherein the inflow element is arranged at least partly within the inlet element and wherein the inflow element is detachably connectable to the inlet element.

13 Claims, 4 Drawing Sheets

FLOWMETER

BACKGROUND OF THE INVENTION

Field of the Invention

The invention is based on the flowmeter having at least one measuring tube and with at least one inlet element, wherein the inlet element is connected to the at least one measuring tube and is arranged before the at least one measuring tube in respect to flow direction.

Description of Related Art

The measurement of the mass flow of a medium, in particular a fluid, flowing through the measuring tube using a flowmeter, for example a Coriolis mass flowmeter, is known from the prior art. A Coriolis mass flowmeter has at least one measuring tube, an oscillation generator and two oscillation sensors, wherein the oscillation sensors are arranged spaced in the longitudinal direction on the inlet side and outlet side ends of the measuring tubes. During operation, the measuring tube with medium flowing through it is brought to oscillation by the oscillation generator. The oscillation sensors measure the generated oscillation at the inlet side and outlet side on the measuring tube. Due to the Coriolis effect, a measurable phase difference arises between the inlet side and the outlet side oscillation. This phase difference is proportional to the mass flow of the medium.

Coriolis mass flowmeters are also known that have more than one measuring tube, for example two or four measuring tubes. All measuring tubes can be brought to oscillation for measurement of the flow. Alternatively, also the flow through just one measuring tube can be measured and, due to the known geometry of the individual measuring tubes, the overall flow can be determined.

Additionally, flowmeters are known that use other principles for determining the mass flow through a measuring tube.

In the area of connection of the flowmeter to external piping, the flowmeter has an inlet element that ends in the measuring tube or measuring tubes. The inlet element can be designed as a funnel or can have a step-like transition of the flow cross section and, in this respect, can represent a receptacle for the measuring tube or measuring tubes. Thereby, the inlet element can be connected, for example, to the housing in a fixed, preferably non-removable manner as a separate component or, for example can be designed as one piece with the housing. In any case, it is a part of the flowmeter. Since the flow cross section is reduced in this area, this connection area is exposed to particularly high loads. In particular, erosive media can damage the inner surfaces in the connection area and, in particular, existing welding seams between the inlet element and the measuring tube or measuring tubes.

In order to overcome the disadvantage of material damage caused by erosive media, it is known to provide an exchangeable transition element between the flange connection of a one-tube Coriolis mass flowmeter and external piping, wherein the transition element simultaneously reduces the flow cross section. If the inner surface of the transition element is damaged or worn, it can simply be replaced.

SUMMARY OF THE INVENTION

Based on the prior art, the object of the invention is to provide the flowmeter that is suitable for the verification of erosive media.

According to the invention, the object is achieved in that at least one inflow element is provided, wherein the inflow element is arranged at least partly within the inlet element and wherein the inflow element is reversibly connectable to the inlet element. This design has the advantage that the inflow element can be replaced simply when it is worn and/or damaged due to being in contact with an erosive medium. Additionally, the inflow element is integrated in the construction of the flowmeter and protects the inner surface of the inlet element and existing connections between the inlet element and at least one measuring tube. In an advantageous manner, it is possible to do without an external component known from the prior art, which is integrated via a further connection in the measurement setup.

According to an advantageous design, the flowmeter is a Coriolis mass flowmeter having at least one oscillation generator and having at least two oscillation sensors. It is particularly preferred that the Coriolis mass flowmeter has two or four measuring tubes.

According to a further advantageous design, the inflow element is connected to the inlet element by means of a force-fit or a form-fit connection.

It is particularly advantageous when the inflow element is connected to the inlet element by means of screwing or clamping or an adhesive connection.

According to a further advantageous design, the inflow element consists at least partially of a metal or a polymer.

According to a next design, the flowmeter has a flange element for connection to external piping, wherein the inflow element is arranged at least partially within the flange element. In this manner, the inflow element also protects the inner, i.e., facing the medium, surface of the flange element as well as possibly existing connecting seams between the flange element and the inlet element.

It is further advantageous when a flange element is provided for connection to external piping and when the inflow element is arranged between the flange element and the at least one measuring tube.

According to a further design, the inflow element is designed as a flow cross section reducer. In this design, the inflow element is exposed to particularly high loads due to the contact with erosive media, since the inflow element has medium directly flowing at it.

According to an alternative design, the flowmeter has a flow cross section reducer within the inlet element, wherein the inflow element is arranged on the flow cross section reducer as a protective shield. This design has the advantage that the flow cross section reducer is permanently fixed, i.e., inseparably, to the inlet element or is designed as one piece with the inlet element and the inflow element designed as protective shield is arranged on the flow cross section reducer. Thereby, the inflow element can completely cover the flow cross section reducer, in particular in such a manner that adjacent connecting seams are also covered. Alternatively, the inflow element can partially cover the flow cross section reducer, in particular at the parts that are exposed to particularly high loads.

A further design is wherein at least two measuring tubes are provided and that the inflow element is designed as flow splitter, which is preferably arranged within the inlet element before the measuring tubes in respect to flow direction.

According to an alternative design, at least two measuring tubes and a flow splitter are provided, wherein the flow splitter is preferably arranged within the inlet element before the two measuring tubes in respect to flow direction and wherein the inflow element as protective shield is arranged on the flow splitter. This design has the advantage that the protective shield can be particularly flexibly designed. For example, the protective shield can completely cover the flow splitter and, in particular, also the adjacent connecting seams. Alternatively, the protective shield only covers the areas of the flow splitter that are exposed to particularly high loads.

According to a further design, the flowmeter has a flange element for connection to external piping, wherein the protective shield is arranged at least partially within the flange element and, thus, protects the inner surface, i.e., the surface of the flange element facing the medium and wherein the protective shield has a protective shield flange. This protective shield flange thereby rests on the connecting surface of the flange element and, thus, is arranged between the flange element of the flowmeter and the flange of the external piping in the connected state.

According to a particularly preferred design, the protective shield has the form of a flow splitter or a flow cross section reducer. In the connected state, the protective shield optimally, i.e., custom-fit, nestles on the integrated flow splitter or flow cross section reducer of the flowmeter.

In detail, there is a plurality of possibilities for designing and further developing the flowmeter according to the invention as will be apparent from the following description of preferred embodiments in conjunction with the accompanying drawings.

DETAILED DESCRIPTION OF THE INVENTION

Figure 1:
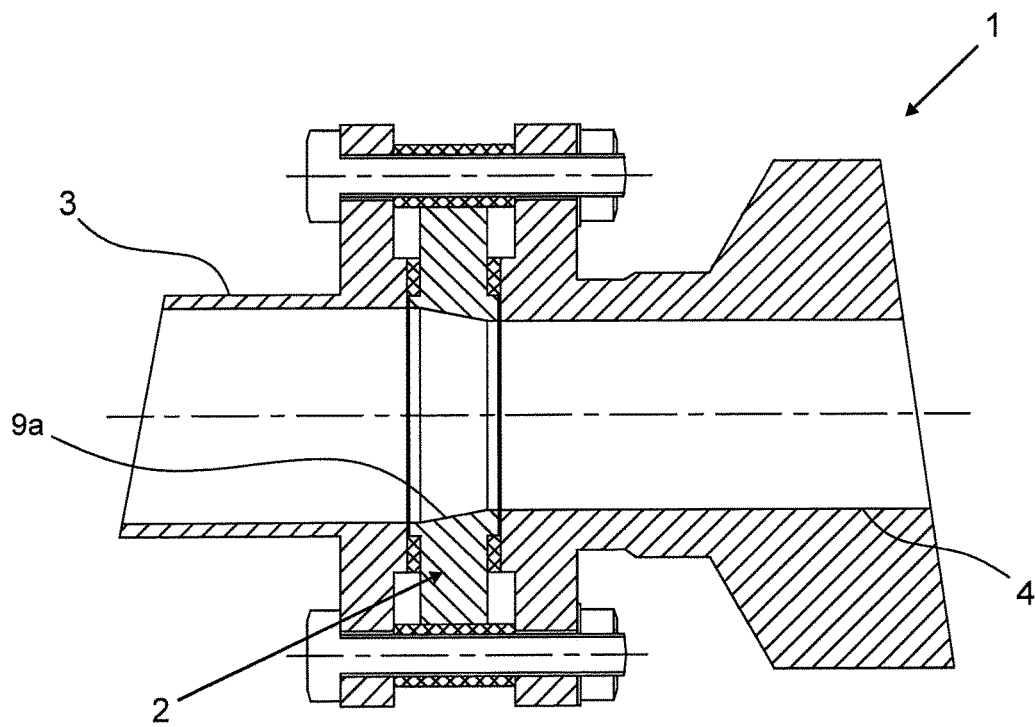
FIG. 1 is a sectional view of a transition element from the prior art in the mounted state.

A sectional view of an end section of a Coriolis mass flowmeter 1 that is connected to external piping 3 via a separate transition element 2 is shown in FIG. 1. The transition element 2 comprises a flow cross section reducer 9a, with which the flow cross section of the external piping 3 is adapted to the flow cross section of the measuring tube 4. If the piping 3 and the measuring tube 4 have erosive medium flowing through them, then, in particular the transition element 2 is exposed to a high load, since the transition element 2 directly has medium flowing at it. If the transition element 2 shows wear or is damaged, it can simply be replaced.

Figure 2:
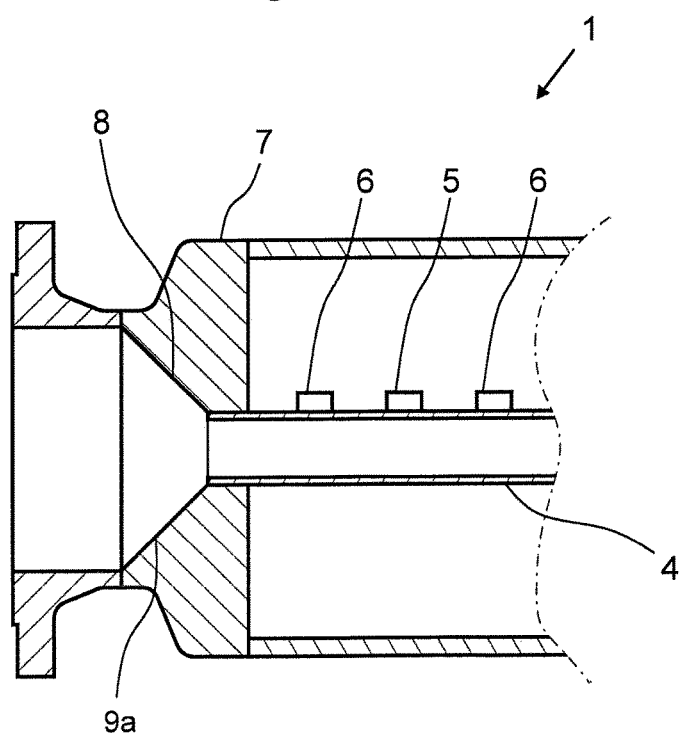
FIG. 2 is a sectional view of a first embodiment of the flowmeter according to the invention.

FIG. 2 shows a first embodiment of The flowmeter 1 according to the invention, wherein the flowmeter is designed as a Coriolis mass flowmeter having a measuring tube 4, an oscillation generator 5 and two oscillation sensors 6 for recording the oscillation of the measuring tube 4 during operation. Additionally, an inlet element 7 is provided that is connected to the measuring tube 4 by means of a welding connection. Furthermore, an inflow element 8 is provided that is arranged within the inlet element 7 and that is detachably connected to the inlet element 7. In the shown embodiment, the inflow element 8 is designed as a simple flow cross section reducer 9a for reducing the cross section to the cross section of the measuring tube 4. Due to the detachable connection, the inflow element 8 can be particularly easily replaced when it is damaged or worn. As opposed to the design of the prior art illustrated in FIG. 1, the measurement setup shown in FIG. 2 has the advantage that the replaceable inflow element 8 is integrated in the construction of the Coriolis mass flowmeter 1 and is not arranged as a separate transition element 2 in the measurement setup.

Figure 3A:
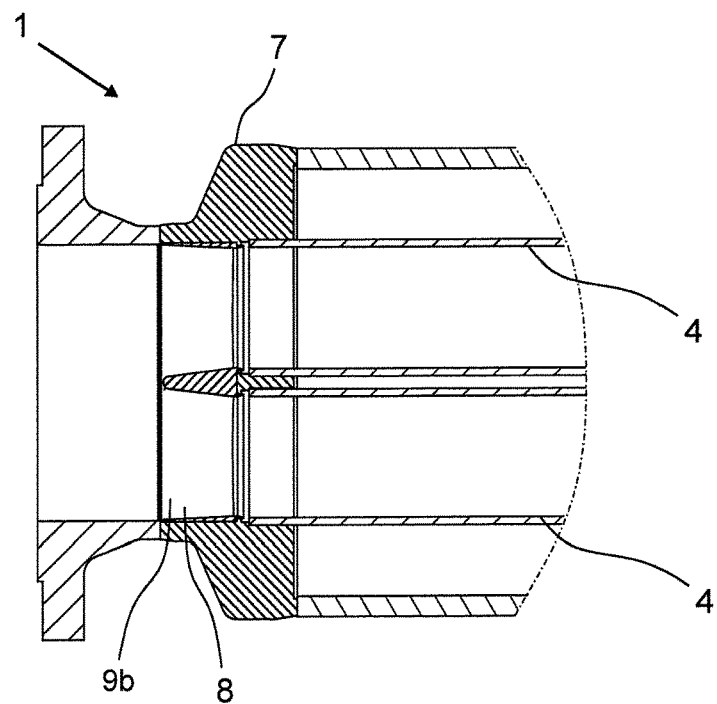
FIG. 3a is a sectional view of a second embodiment of the flowmeter according to the invention.
Figure 3B:
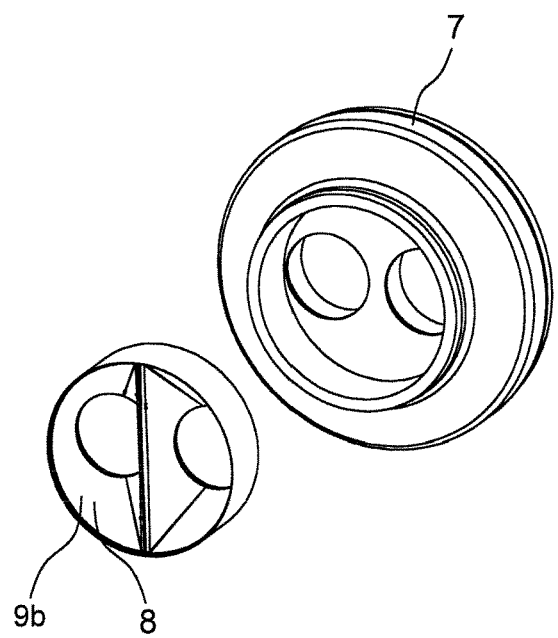
FIG. 3b is an exploded view of a combination of an inlet element and flow splitter according to the second embodiment.

FIG. 3a shows the end section of a second embodiment of the flowmeter 1 that is designed as a Coriolis mass flowmeter 1. The Coriolis mass flowmeter 1 has two measuring tubes 4, an inlet element 7 that is connected to the measuring tubes 4 and a flow splitter 9b that is arranged within the inlet element 7 before the measuring tubes 4. The flow splitter 9b is simultaneously designed as inflow element 8 that is detachably connected to the inlet element 7. FIG. 3b shows the combination of the inlet element 7 and the flow splitter 9b designed as inflow element 8 in an exploded view. This design has the advantage that the replaceable inflow element 8 is integrated in the setup of the Coriolis mass flowmeter 1.

Figure 4A:
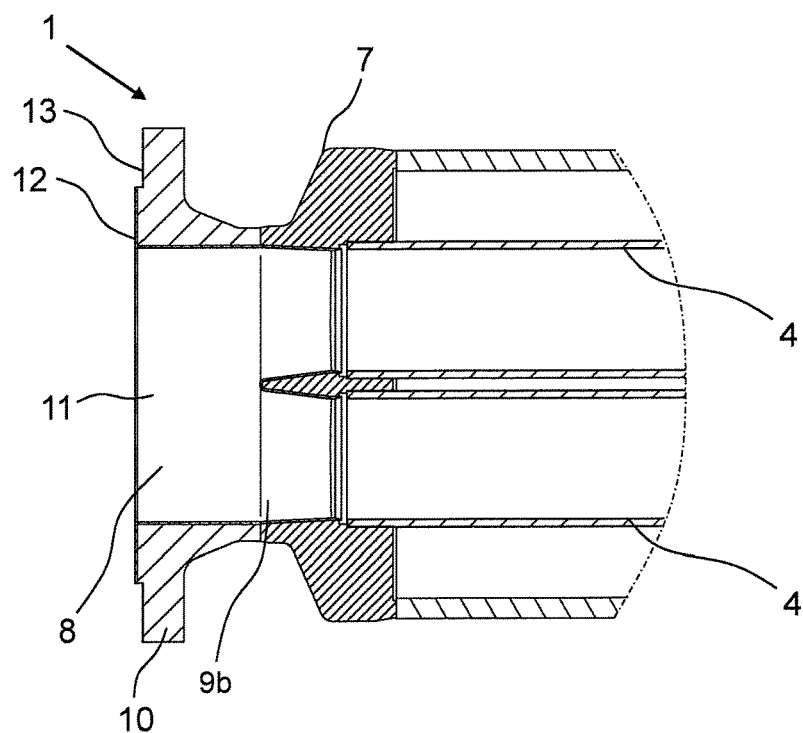
FIG. 4a is a sectional view of a third embodiment of the flowmeter according to the invention.
Figure 4B:
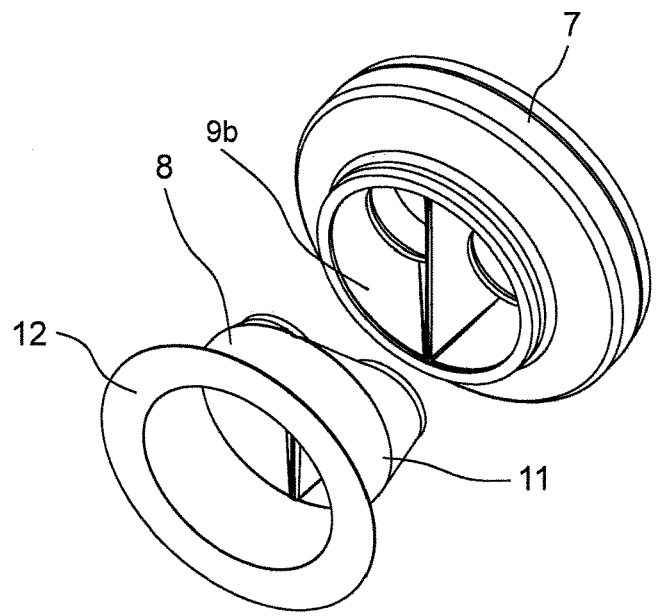
FIG. 4b is an exploded view of a combination of inlet element, flow splitter and protective shield according to the third embodiment.

FIG. 4a shows a sectional view of the end sections of a third embodiment of the flowmeter 1 that is designed as Coriolis mass flowmeter 1. The illustrated Coriolis mass flowmeter 1 has two measuring tubes 4, an inlet element 7 that is connected to the measuring tubes 4 and a flow splitter 9b. A flange element 10 is connected to the inlet element 7 for connection to external piping 3. Additionally, an inflow element 8 designed as protective shield 11 is provided that covers both the flow splitter 9b as well as the flange element 10. Additionally, the inflow element 8 also has a protective shield flange 12, which rests on the connecting area 13 of the flange element 10. FIG. 4b shows the combination of the inlet element 7 with the flow splitter 9b and the inflow element 8 designed as protective shield 11 in an exploded view.

Figure 5:
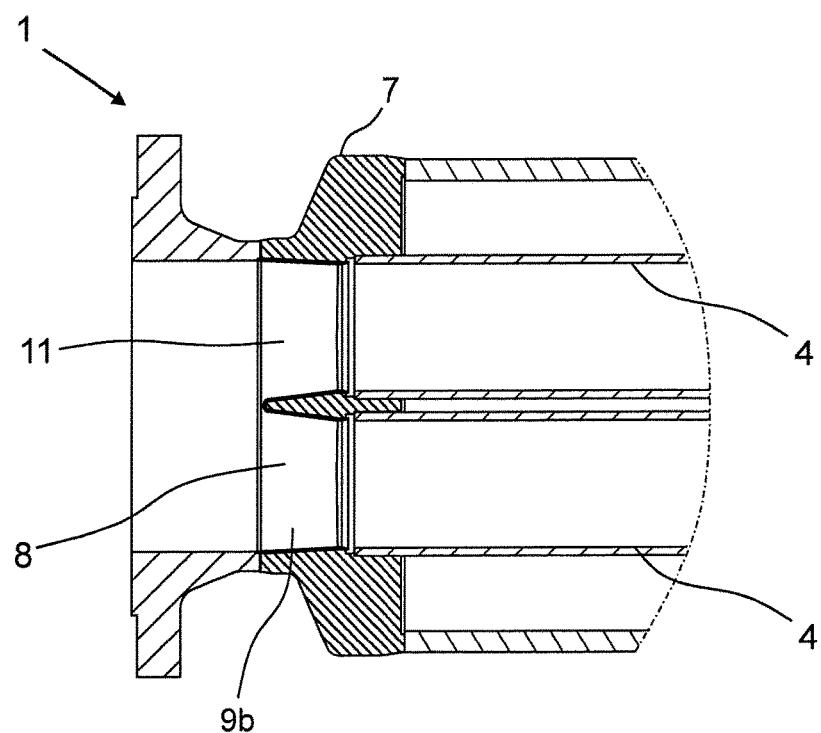
FIG. 5 is a fourth embodiment of the flowmeter according to the invention.

FIG. 5 shows a sectional view of the end section of a fifth embodiment of the flowmeter 1 in the form of a Coriolis mass flowmeter 1 that has two measuring tubes 4, an inlet element 7 connected to the measuring tubes 4, and a flow splitter 9b. A replaceable inflow element 8 designed as protective shield 11 is arranged on the flow splitter 9b, which, as opposed to the embodiment illustrated in FIGS. 4a and 4b, covers only the flow splitter 9b. The embodiment shows that insofar as the inflow element 8 is designed as a protective shield 11, the inflow element 8 can be particularly flexibly designed.

What is claimed is:

1. A flowmeter, comprising:
   at least one measuring tube and
   at least one inlet element,
   wherein the inlet element is connected to the at least one measuring tube and is arranged before the at least one measuring tube in respect to a direction of flow,
   wherein at least one inflow element is arranged at least partially within the inlet element,
   wherein the inflow element is detachably connectable to the inlet element, and
   wherein the flowmeter is a Coriolis mass flowmeter with at least one oscillation generator and with at least two oscillation sensors.

2. The flowmeter according to claim 1, wherein the inflow element is connected to the inlet element by means of a force-fit or a form-fit connection.

3. The flowmeter according to claim 1, wherein the inflow element is connected to the inlet element by means of screwing, clamping or adhesive.

4. The flowmeter according to claim 1, wherein the inflow element is formed at least partially of a metal or a polymer.

5. The flowmeter according to claim 1, wherein a flange element is provided for attachment to external piping and wherein the inflow element is arranged at least partially within the flange element.

6. The flowmeter according to claim 1, wherein a flange element is provided for attachment to external piping and wherein the inflow element is arranged between the flange element and the at last one measuring tube.

7. The flowmeter according to claim 1, wherein the inflow element is a flow cross section reducer.

8. The flowmeter according to claim 1, wherein a flow cross section reducer is arranged within the inlet element and wherein the inflow element is a protective shield on the flow cross section reducer.

9. Flowmeter according to claim 8, wherein a flange element is provided for attachment to external piping, wherein the protective shield is arranged at least partially within the flange element and wherein the protective shield has a protective shield flange.

10. Flowmeter according to claim 8, wherein the protective shield has is a flow splitter or a flow cross section reducer.

11. The flowmeter according to claim 1, wherein said at least one measuring tube comprises at least two measuring tubes, wherein a flow splitter is provided and wherein the inflow element a protective shield\arranged on the flow splitter.

12. The flowmeter according to claim 11, wherein the flow splitter is arranged before the at least two measuring tubes relative to a flow direction within the inlet element.

13. A flowmeter, comprising:
at least one measuring tube and
at least one inlet element,
wherein the inlet element is connected to the at least one measuring tube and is arranged before the at least one measuring tube in respect to a direction of flow,
wherein the inflow element is detachably connectable to the inlet element, and
wherein at least two measuring tubes are provided and that the inflow element is designed as flow splitter, which is preferably arranged within the inlet element before the measuring tube in respect to flow direction.

* * * * *